United States Patent
Yang et al.

(10) Patent No.: US 10,472,242 B2
(45) Date of Patent: Nov. 12, 2019

(54) METHOD FOR PREPARING GRAPHENE BY USING HIGH SPEED HOMOGENIZATION PRETREATMENT AND HIGH PRESSURE HOMOGENATION

(71) Applicant: LG Chem, Ltd., Seoul (KR)

(72) Inventors: Seung Bo Yang, Daejeon (KR); Kwon Nam Sohn, Daejeon (KR); Won Jong Kwon, Daejeon (KR); Se Ho Park, Daejeon (KR); Mi Jin Lee, Daejeon (KR)

(73) Assignee: LG Chem, Ltd. (KR)

( * ) Notice: Subject to any disclaimer, the term of this patent is extended or adjusted under 35 U.S.C. 154(b) by 144 days.

(21) Appl. No.: 15/518,311

(22) PCT Filed: Dec. 10, 2015

(86) PCT No.: PCT/KR2015/013531
§ 371 (c)(1),
(2) Date: Apr. 11, 2017

(87) PCT Pub. No.: WO2016/093645
PCT Pub. Date: Jun. 16, 2016

(65) Prior Publication Data
US 2017/0305747 A1 Oct. 26, 2017

(30) Foreign Application Priority Data
Dec. 11, 2014 (KR) .................. 10-2014-0178603

(51) Int. Cl.
*C01B 32/19* (2017.01)
*B82Y 30/00* (2011.01)
(Continued)

(52) U.S. Cl.
CPC .............. *C01B 32/19* (2017.08); *B82Y 30/00* (2013.01); *B82Y 40/00* (2013.01); *C01B 32/225* (2017.08); *C01B 2204/32* (2013.01)

(58) Field of Classification Search
CPC ..... C01B 32/182; C01B 32/184; C01B 32/19; C01B 32/192; C01B 2204/04;
(Continued)

(56) References Cited

U.S. PATENT DOCUMENTS 6,287,694 B1   9/2001 Zaleski et al.
6,828,064 B1   12/2004 Nardi
(Continued)

FOREIGN PATENT DOCUMENTS

CN   104176727 A   12/2014
EP   3157864 A1   4/2017
(Continued)

OTHER PUBLICATIONS

Tölle, Folke Johannes, Martin Fabritius, and Rolf Mülhaupt. "Emulsifier-Free Graphene Dispersions with High Graphene Content for Printed Electronics and Freestanding Graphene Films." Advanced Functional Materials 22.6 (2012): 1136-1144.*

(Continued)

*Primary Examiner* — Richard M Rump
(74) *Attorney, Agent, or Firm* — Lerner, David, Littenberg, Krumholz & Mentlik, LLP

(57) ABSTRACT

The present invention relates to a method for preparing graphene which comprises subjecting expanded graphite to high speed homogenization to prepare a feed solution and then subjecting the same to high pressure homogenization, thereby increasing the degree of dispersion of expanded graphite in the feed solution and so improving the efficiency of high pressure homogenization. Therefore, the present method has features that the efficiency of graphene prepa- (Continued)

ration is excellent and the size of graphene to be prepared is uniform, compared with a conventional process.

11 Claims, 7 Drawing Sheets

(51) Int. Cl.
*B82Y 40/00* (2011.01)
*C01B 32/225* (2017.01)

(58) Field of Classification Search
CPC ............ C01B 2204/32; C01P 2004/24; C01P 2006/80; Y10S 977/842; Y10S 977/734; B82Y 30/00; B82Y 40/00
See application file for complete search history.

(56) References Cited

U.S. PATENT DOCUMENTS

| | | |
|---|---|---|
| 2010/0028681 A1 | 2/2010 | Dai et al. |
| 2010/0147188 A1 | 6/2010 | Mamak et al. |
| 2011/0114897 A1 | 5/2011 | Aksay et al. |
| 2013/0101497 A1 | 4/2013 | Makhmutov et al. |
| 2013/0180912 A1* | 7/2013 | Li ............... B01D 67/0079 210/500.21 |
| 2013/0260150 A1 | 10/2013 | Grivei et al. |
| 2014/0044968 A1 | 2/2014 | Papakonstantinou et al. |
| 2014/0377161 A1 | 12/2014 | Nozato et al. |
| 2015/0279506 A1 | 10/2015 | Wolfrum et al. |
| 2017/0190583 A1* | 7/2017 | Cesareo ............... C01B 32/19 |

FOREIGN PATENT DOCUMENTS

| | | | |
|---|---|---|---|
| JP | H0840712 A | | 2/1996 |
| JP | 2001524925 A | | 12/2001 |
| JP | 2002500428 A | | 1/2002 |
| JP | 2008151773 A | | 7/2008 |
| JP | 2011510906 A | | 4/2011 |
| JP | 2011513167 A | | 4/2011 |
| JP | 2013100219 A | | 5/2013 |
| JP | 2013535402 A | | 9/2013 |
| JP | 2014009151 A | | 1/2014 |
| JP | 2014009151 A | * | 1/2014 |
| JP | 2015532325 A | | 11/2015 |
| KR | 101119182 B1 | | 3/2012 |
| KR | 101142525 B1 | | 5/2012 |
| KR | 20130004638 A | | 1/2013 |
| KR | 101264316 B1 | | 5/2013 |
| KR | 20130083128 A | | 7/2013 |
| WO | 2011019095 A1 | | 2/2011 |
| WO | 2013122045 A1 | | 8/2013 |

OTHER PUBLICATIONS

Hossain, M.M., et al., Synthesis of Highly Dispersed and Conductive Graphene Sheets by Exfoliation of Preheated Graphite in a Sealed Bath and its Applications to Polyimide Nanocomposites, Bull. Korean Chem. Soc. 2014, vol. 35, No. 7, pp. 2049-2056.
Yi, Min et al. "A Fluid Dynamics Route for Producing Graphene and Its Analogues," Chinese Science Bulletin, Apr. 4, 2014 (Published online) vol. 59 No. 16 pp. 1794-1799 See p. 1795 left column lines 13-27; p. 1795, right column lines 8-12; p. 1797 right column, lines 1-7; and figures 1-2, 5.
Paton, Keith R. et al. "Scalable Production of Large Quantities of Defect-Free Few-Layer Graphene by Shear Exfoliation in Liquids" Nature Matetials Apr. 20, 2014 (Published online) vol. 13, No. 6, pp. 624-630 See p. 625, left column, lines 2-7; p. 629, left column, lines 16-19; and figure 1.
Liang, Shuaishuai et al "One-Step Green Synthesis of Graphene Nanomesh by Fluid-based Method" RSC Advances, Apr. 2, 2014 (Published online), vol. 4, No. 31, pp. 16127-16131, See abstract; p. 16127 right column, line 6 p. 16128, left column, line 16 and and figures1-2.
International Search Report for Application No. PCT/KR2015/013531 dated Apr. 1, 2016.
Tolle, F.J., et al., Emulsifier-Free Graphene Dispersions with High Graphene Content for Printed Electronics and Freestanding Graphene Films, Advanced Functional Materials, 2012, Wileyonlinelibrary.com, pp. 1-9.
Extended European Search Report for Application No. EP15867942.3 dated Aug. 25, 2017.
Shen et al., "Preparation of graphene by jet cavitation", Nanotechnology, IOP Publishing, vol. 22, No. 36, Aug. 16, 2011, 365306, 7 pages.
Bonaccorso et al., "Production and processing of graphene and 2d crystals", Materialstoday, vol. 15, No. 12, Dec. 1, 2012, pp. 564-589.

* cited by examiner

[FIG. 1]
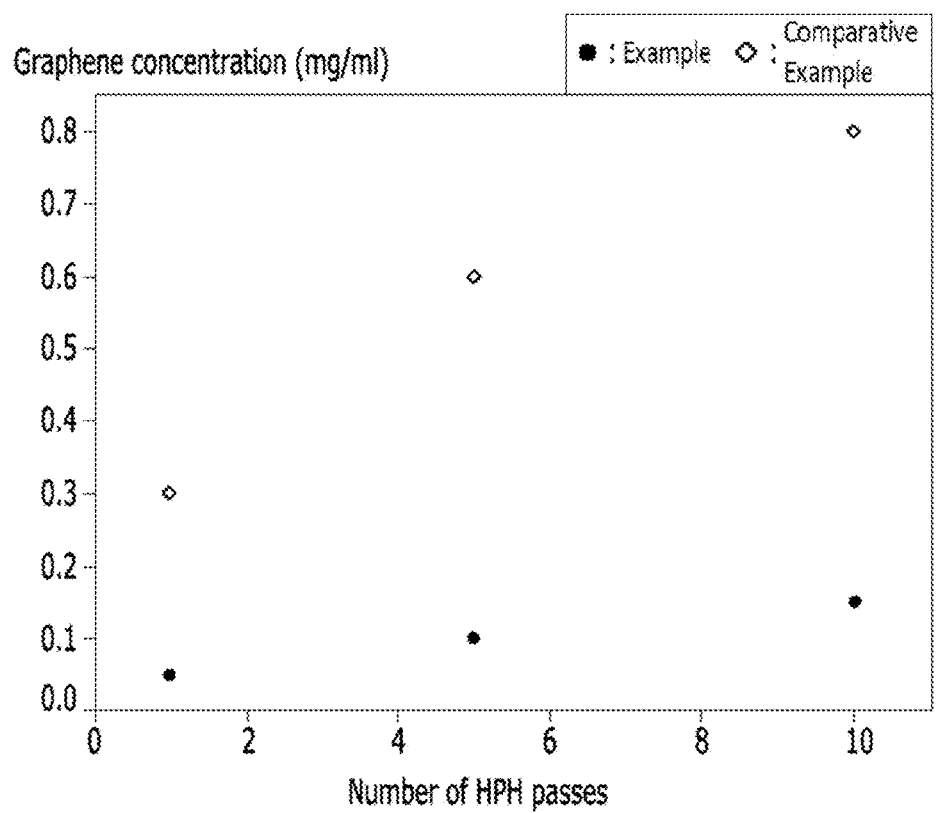

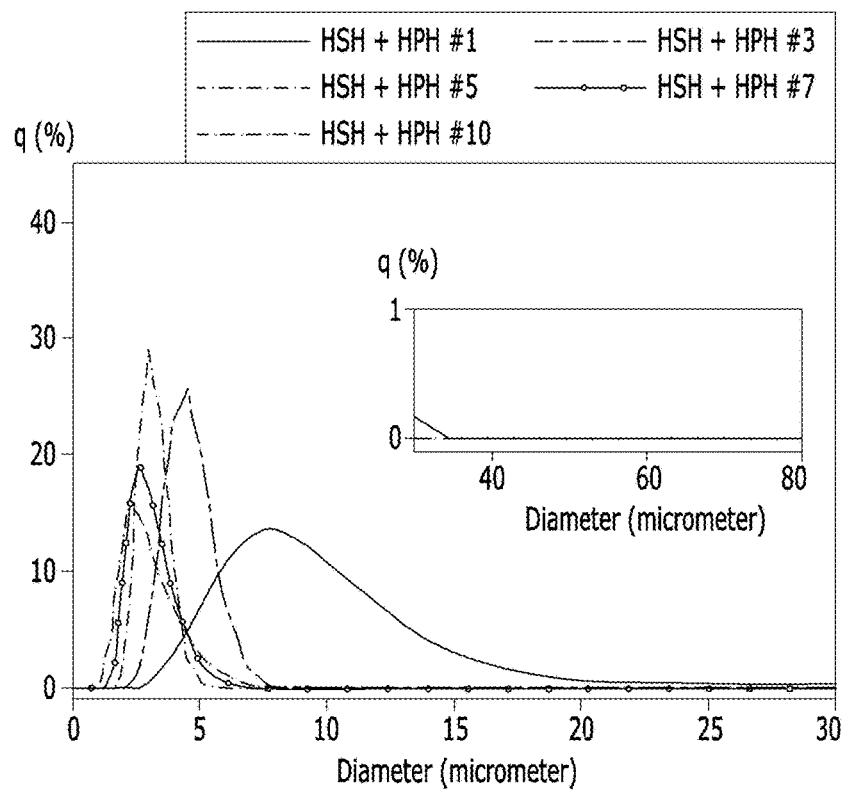
[FIG. 2]

[FIG. 3]
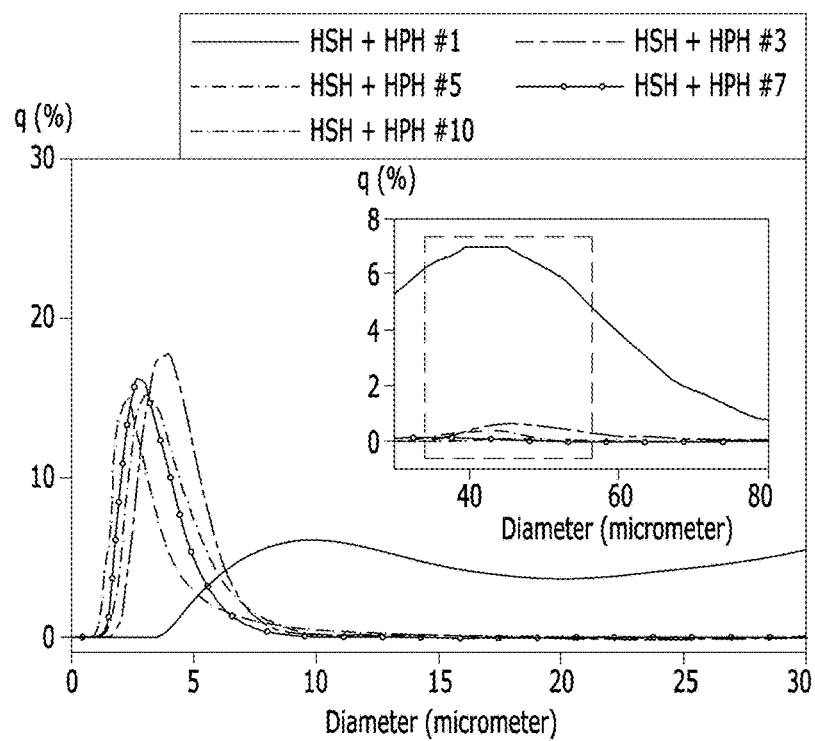

[FIG. 4a]
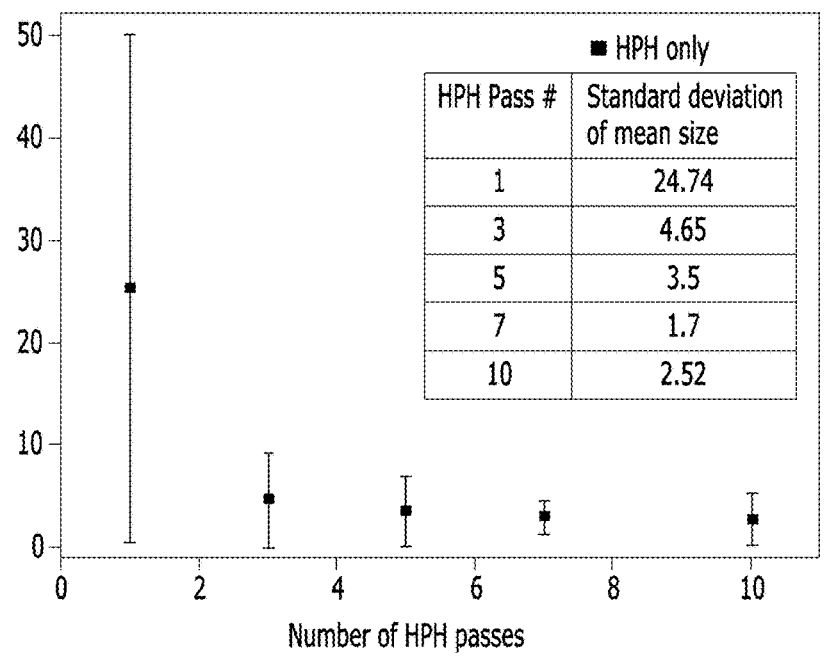

[FIG. 4b]
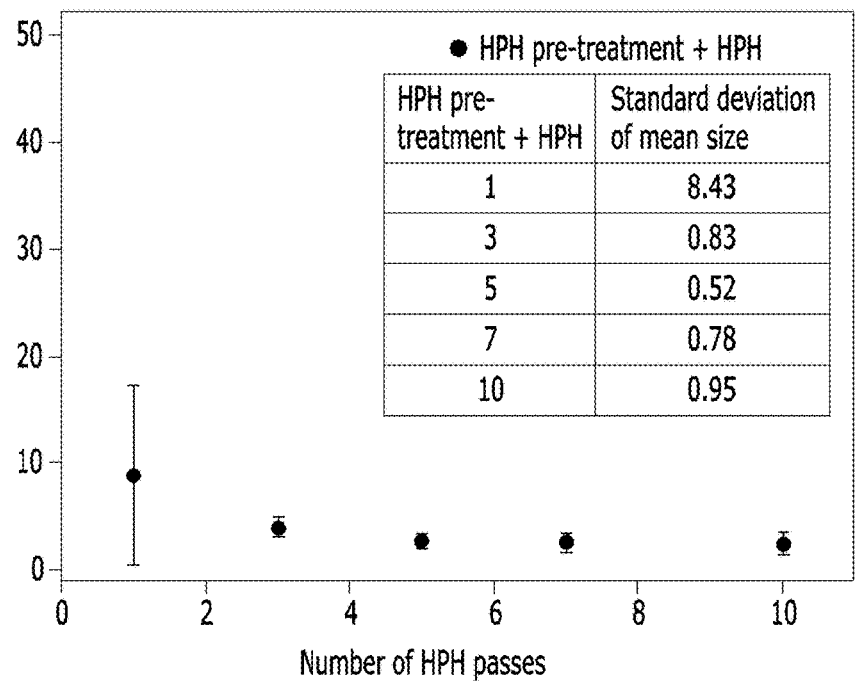

[FIG. 5]
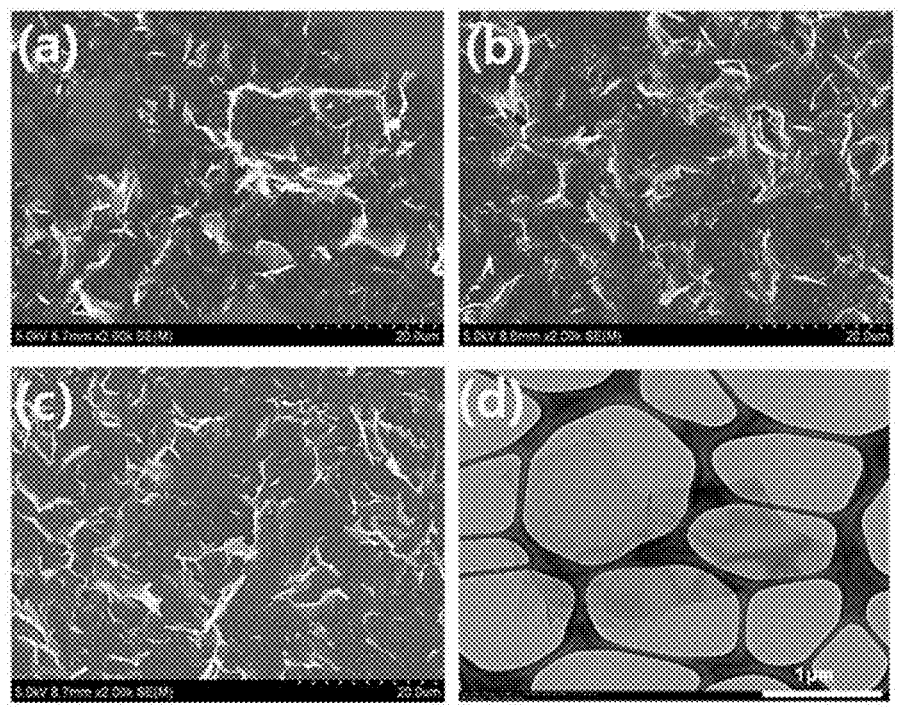

[FIG. 6]
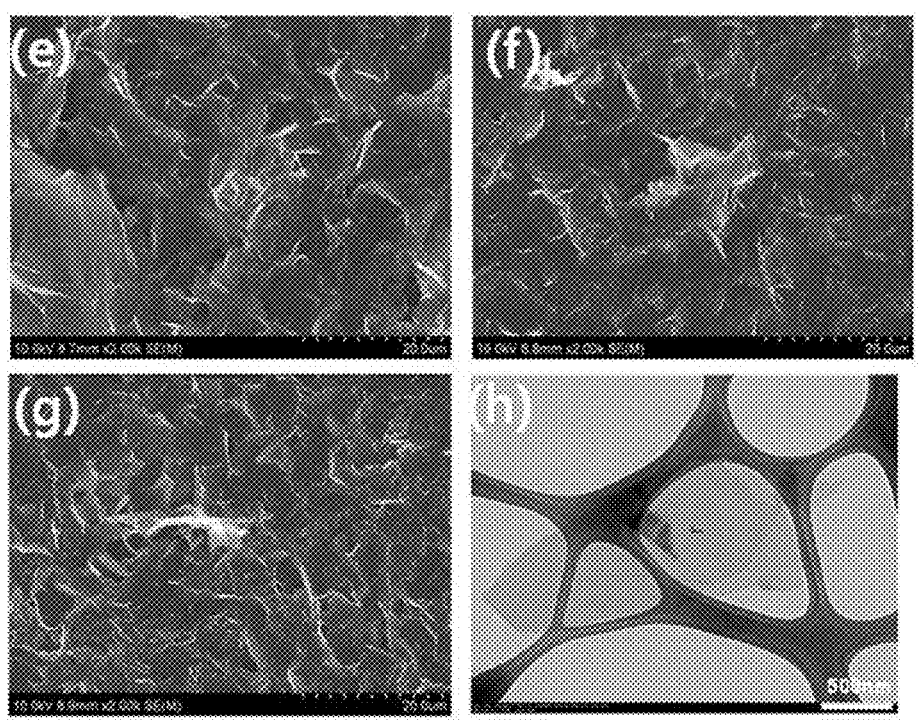

METHOD FOR PREPARING GRAPHENE BY USING HIGH SPEED HOMOGENIZATION PRETREATMENT AND HIGH PRESSURE HOMOGENATION

CROSS-REFERENCE TO RELATED APPLICATION(S)

This application is a national phase entry under 35 U.S.C. § 371 of International Application No. PCT/KR2015/013531, filed Dec. 10, 2015, published in Korean, which claims the benefit of priority from Korean Patent Application No. 10-2014-0178603 filed on Dec. 11, 2014 with the Korean Intellectual Property Office, the disclosures of which are hereby incorporated herein by reference.

TECHNICAL FIELD

The present invention relates to a method for preparing graphene by using high speed homogenization pretreatment and high pressure homogenization.

BACKGROUND OF ART

Graphene is a semi-metallic material where carbon atoms form an arrangement connected in a hexagonal shape by two-dimensional sp2 bonding while having a thickness corresponding to a carbon atom layer. Recently, it has been reported that the properties of a graphene sheet having one carbon atomic layer were evaluated, and as a result, the graphene sheet may show very excellent electrical conductivity of electron mobility of about 50,000 $cm^2/Vs$ or more.

Further, graphene has the properties of structural and chemical stability and excellent thermal conductivity. In addition, graphene is consisting of only carbon which is a relatively light element, and thus, easy to be processed in one-dimensional or two-dimensional nano-patterns. Due to such electrical, structural, chemical and economical properties, graphene is expected to replace a silicon-based semiconductor technology and a transparent electrode in the future, and especially, is possible to be applied to a flexible electronic device field due to excellent mechanical properties.

Due to the numerous advantages and excellent properties of graphene, various methods capable of more effective mass production of the graphene from carbon-based materials such as graphite, have been suggested or studied. In particular, a method capable of easily preparing a graphene sheet or flake with less defect generation, and having a smaller thickness and a large area has been studied in various ways, so that excellent properties of the graphene are more dramatically expressed. Such existing methods of preparing graphene include the following:

First, a method wherein a graphene sheet is exfoliated from graphite by a physical method such as using a tape, is known. However, such method is not suitable for mass production, and has a very low exfoliation yield.

Another method wherein graphite is exfoliated by a chemical method such as oxidation, or acid, base, metal, and the like are inserted between the graphite carbon layers to obtain graphene or an oxide thereof that is exfoliated from an intercalation compound, is known.

However, the former method may generate a number of defects on finally prepared graphene, in the course of obtaining graphene by proceeding with exfoliating by oxidation of graphite, and reducing a graphene oxide obtained therefrom again to obtain graphene. This may adversely affect the properties of finally prepared graphene. Further, the latter method also requires further processes such as using and treating the intercalation compound, and thus, the overall process is complicated, the yield is insufficient, and the economics of the process may be poor. Moreover, it is not easy to obtain a graphene sheet or flake having a large area in such a method.

Due to the problems of those methods, recently, a method of preparing graphene by exfoliating carbon layers contained in graphite by a milling method using ultrasonic irradiation, a ball mill or the like, in a state of dispersing graphite and the like in liquid, is applied the most. However, these methods also had problems of being difficult to obtain graphene having sufficiently small thickness and a large area, generating a number of defects on graphene in an exfoliating process, or having an insufficient exfoliation yield, or the like.

Therefore, there is a continuous demand for a preparation method capable of easily preparing a graphene sheet or flake having a smaller thickness and a large area in a higher yield.

DETAILED DESCRIPTION OF THE INVENTION

Technical Problem

For resolving the aforesaid problems of the prior arts, it is an object of the present invention to provide a method for preparing graphene that can produce graphene of uniform size in an excellent efficiency by using high speed homogenization pretreatment and high pressure homogenization.

Technical Solution

In order to achieve these objects, the present invention provides a method for preparing graphene comprising:

a step of subjecting a dispersion solution containing expanded graphite and a dispersant to high speed homogenization to prepare a feed solution (step 1); and a step of passing the feed solution through a high-pressure homogenizer including an inlet, an outlet, and a microchannel that connects between the inlet and the outlet and has a diameter in a micrometer scale (step 2).

The term "graphite" as used herein is a material also called black lead or plumbago, and is a mineral belonging to a hexagonal system having a crystal structure such as quartz, and has black color and metallic luster. Graphite has a layered, planar structure, and a single layer of graphite is called 'graphene' that tries to produce in the present invention, and thus graphite is a main raw material for the production of graphene.

In order to exfoliate graphene from graphite, it is necessary to apply energy that can overcome the π-π interaction between stacked graphenes. In the present invention, high-pressure homogenization method is used as in step 2 to be described later. The high-pressure homogenization method can apply a strong shear force to graphite, and thus the exfoliation efficiency of graphene is excellent, but if the graphite in the feed solution used for high-pressure homogenization is not sufficiently dispersed, there is a problem that the easiness and efficiency of the high-pressure homogenization process are decreased.

On the other hand, hi order to increase the exfoliation efficiency of high pressure homogenization, it is desirable that the interlayer spacing of graphite is wider than that of pristine graphite. In the present invention, expanded graphite is used for this purpose.

As used herein, the term 'expanded graphite' refers to graphite having a wider interlayer spacing than that of a pristine graphite. The expanded graphite can include a thermally expanded graphite, a modified graphite in which an intercalation compound is inserted between carbon layers, a partially oxidized graphite, an edge functionalized graphene, and the like. Further, the expanded graphite has a tap density of 0.01 to 0.5 g/cm$^3$ and BET (surface area) of 5 to 50 m$^2$/g. The expansion degree can be measured by putting a certain amount of powder sample in a graduated cylinder, inputting the number of taps followed by operation, reading the scale of the cylinder, and dividing the mass of the powder by the final apparent volume of the powder when the volume change is within 2%. In addition, BET surface area can be measured by adsorbing nitrogen gas on the surface of the powder, measuring the amount of nitrogen gas absorbed and calculating the surface area by BET equation. At this time, the adsorption amount of nitrogen gas can be measured by the pressure change of the vacuum chamber while changing the pressure of nitrogen gas at a given temperature.

On the other hand, the expanded graphite has a wider interlayer spacing than that of a pristine graphite, which means that the $\pi$-$\pi$ interaction energy between the stacked graphenes is low, and thus the graphene exfoliation is facilitated and it is advantageous in preparing graphene with a smaller thickness. However, since the expanded graphite has a low density due to a large interlayer spacing, there is a problem that the degree of dispersion in the feed solution used for high pressure homogenization is very low.

Thus, the present invention includes a step of subjecting the expanded graphite to high speed homogenization before application of high pressure homogenization, as in step 1 to be described later, and thereby can solve a problem during application of high pressure homogenization due to low density of expanded graphite.

Hereinafter, the present invention will be described step-by-step.

Step of Subjecting a Dispersion Solution Containing Expanded Graphite and a Dispersant to High Speed Homogenization to Prepare a Feed Solution (Step 1)

This is a step of preparing a feed solution to be applied to the high-pressure homogenization of step 2 to be described later, in which the dispersion solution containing expanded graphite is subjected to high speed homogenization to increase the degree of dispersion of the expanded graphite in the feed solution.

The definition and type of expanded graphite are as described above.

Further, a dispersant is used to increase the degree of dispersion of the expanded graphite. The dispersant acts to maintain its dispersed state through hydrophobic expanded graphite, interlayer exfoliated expanded graphite or graphene due to amphiphilic properties, and are also referred to as surfactants in other terms. As the dispersing agent, any dispersant may be used without particular limitation as long as it is used for graphene exfoliation, and for example, an anionic surfactant, a nonionic surfactant, a cationic surfactant and the like can be used. Specific examples thereof include pyrene-based low molecular weight derivatives; cellulosic polymers; cationic surfactants; anionic surfactants; gum arabic; n-dodecyl b-D-maltoside; amphoteric surfactants; polyvinylpyrrolidone-based polymers; polyethylene oxide-based polymers; ethylene oxide-propylene oxide copolymers; tannic acid; or a mixture of plural kinds of polyaromatic hydrocarbon oxides, which is a mixture containing polyaromatic hydrocarbon oxides having a molecular weight of 300 to 1000 in an amount of 60 wt % or more.

The weight ratio of the expanded graphite and the dispersant is preferably 2.5 to 20. If the weight ratio is less than 2.5, the content of expanded graphite is too low and thus the exfoliation efficiency decreases. If the weight ratio is more than 20, the content of the dispersing agent is too low and thus the dispersing effect of expanded graphite decreases. More preferably, the weight ratio of the expanded graphite and the dispersant is 2.5 to 5.

Further, the concentration of expanded graphite in the dispersion solution is preferably 0.5 to 5% by weight. If the concentration is less than 0.5% by weight, the content of expanded graphite is too low and the yield in the exfoliation step decreases. If the concentration exceeds 5% by weight, the content of expanded graphite is too high and thus the effects of high speed homogenization due to increase in viscosity and high pressure homogenization of step 2 described below decrease.

As the solvent of the dispersion solution, one or more selected from the group consisting of water, NMP (N-methyl-2-pyrrolidone), acetone, DMF (N,N-dimethylformamide), DMSO (dimethyl sulfoxide), CHP (cyclohexyl-pyrrolidinone), N12P (N-dodecyl-pyrrolidone), benzyl benzoate, N8P (N-octyl-pyrrolidone), DMEU (dimethyl-imidazolidinone), cyclohexanone, DMA (dimethylacetamide), NMF (N-methyl formamide), bromobenzene, chloroform, chlorobenzene, benzonitrile, quinoline, benzyl ether, ethanol, isopropyl alcohol, methanol, butanol, 2-ethoxyethanol, 2-butoxyethanol, 2-methoxypropanol, THF (tetrahydrofuran), ethylene glycol, pyridine, N-vinylpyrrolidone, methyl ethyl ketone (butanone), alpha-terpineol, formic acid, ethyl acetate and acrylonitrile may be used.

The high-speed homogenization refers to stirring the dispersion solution, preferably, stirring the dispersion solution at 3000 to 8000 rpm. The high-speed homogenization is preferably carried out for 0.5 to 3 hours. When the homogenization time is less than 0.5 hour, there is a limit that the degree of dispersion is lowered, and when the homogenization time exceeds 3 hours, the degree of dispersion does not substantially increase any more.

The stirring can be carried out using a high speed homogenizer. Part of the interlayers in the expanded graphite having a wide interlayer spacing is separated by mixing based on the high shear rate (>$10^4$ sec$^{-1}$) applied between the rotor and stator of the high speed homogenizer. Thus, the size of the expanded graphite becomes small and the degree of dispersion in the dispersion solution become high. Thereby, when used as a feed solution for high pressure homogenization in step 2 to be described later, the improvement in graphene exfoliation process and the exfoliation efficiency are remarkably increased.

Step of Passing the Feed Solution Through a High-Pressure Homogenizer Including an Inlet, an Outlet, and a Micro-Channel that Connects Between the Inlet and the Outlet and has a Diameter in a Micrometer Scale (Step 2)

This is a step of subjecting the feed solution prepared in the above step 1 to high pressure homogenization to exfoliate graphene from the expanded graphite in the feed solution.

The term 'high-pressure homogenization' refers to applying a high pressure to a micro-channel having a diameter in a micrometer scale, and applying a strong shear force to the material passing through it. Generally, the high-pressure homogenization is performed using a high-pressure homogenizer including an inlet, an outlet, and a micro-channel that connects between the inlet and the outlet and has a diameter in a micrometer scale.

Since the shear force is applied while passing through the micro-channel, the dispersibility of the material passing through the channel is required. For example, when a feed solution having poor dispersibility is used, there may arise problems such as passing only the solvent from the inlet of the high pressure homogenizer to the micro-channel or clogging of the micro-channel. Therefore, since the material having poor dispersibility is difficult to pass through the micro-channel, there may be cases where the substance remains in the inlet of the high-pressure homogenizer and so does not pass through the micro-channel, resulting in reduction of high pressure homogenization efficiency.

In particular, when the expanded graphite is applied to high-pressure homogenization as in the present invention, due to the low density of expanded graphite it floats on the feed solution or has a low degree of dispersion in the feed solution, and thus it is difficult to pass through the micro-channel.

Therefore, in the present invention, since a feed solution excellent in dispersibility produced by the high-speed homogenization in the step 1 is used, the feed solution can well pass through micro-channel when supplied to the inlet of the high pressure homogenizer and pressurized.

According to the example and the comparative example of the present invention, the feed solution subjected to high-speed homogenization process as in the step 1 well passes through the micro-channel and the graphene is well exfoliated. However, the feed solution not subjected to high speed homogenization does not well passes through the micro-channel and a considerable amount of the solution remains in the inlet of the high-pressure homogenizer, thereby remarkably deteriorating the exfoliation efficiency of graphene.

The micro-channel has preferably a diameter of 50 to 300 μm. Further, it is preferable that the feed solution is introduced in the inlet of the high-pressure homogenizer under application of a pressure of 500 to 3000 bar and passed through the micro-channel.

Furthermore, the feed solution that has passed through the micro-channel according to the step 2 can be reintroduced into the inlet of the high-pressure homogenizer, whereby graphene can be additionally exfoliated.

The reintroducing may be repeated twice to ten times. The reintroducing can be carried out by repeatedly using the high-pressure homogenizer used or by using a plurality of high-pressure homogenizers. In addition, the reintroducing may be separately performed by each process, or performed continuously.

Meanwhile, the method may further include a step of recovering and drying graphene from the dispersion solution of graphene recovered in the outlet according to the step 2. The recovering may be carried out by centrifugation, vacuum filtration or pressure filtration. Further, the drying may be carried out by vacuum drying at a temperature of about 30 to 200° C.

The graphene produced according to the present invention has a lateral size of 1 to 5 μm. Here, the 'lateral size' of the graphene can be defined as the longest distance of the linear distance connecting arbitrary two points on the plane of each particle, when each particle of partially oxidized graphene is viewed on a plane having the widest area.

In addition, the size of graphene produced according to the present invention is uniform, which is advantageous in expressing characteristics inherent to graphene. By re-dispersing the prepared graphene in various solvents, it can be applied to various applications and uses such as a conductive paste composition, a conductive ink composition, a composition for forming a heat dissipation substrate, an electrically conductive composite, a composite for EMI shielding, a conductive material or slurry for a battery, and the like.

As for the above-mentioned solvent, a solvent used for graphene dispersion in the art can be used without limitation, and for example, a solvent of the expanded graphite dispersion solution described above can be used.

Advantageous Effects

The method for preparing graphene according to the present invention comprises subjecting expanded graphite to high speed homogenization to prepare a feed solution and then subjecting the same to high pressure homogenization, thereby increasing the degree of dispersion of expanded graphite in the feed solution and so improving the efficiency of high pressure homogenization. Therefore, the present method has features that the efficiency of graphene preparation is excellent and the size of graphene to be prepared is uniform, compared with a conventional process.

BRIEF DESCRIPTION OF THE DRAWINGS

FIG. 1 shows a graph showing graphene concentrations of the respective samples obtained in Examples and Comparative Examples of the present invention.

FIG. 2 shows the results of measuring the lateral size distribution of graphene in each sample obtained in Example of the present invention.

FIG. 3 shows the results of measuring the lateral size distribution of graphene in each sample obtained in Comparative Example of the present invention.

FIG. 4 shows the results of measuring the standard deviation of the size of graphene in each sample obtained in Comparative Example (FIG. 4 (a)) and Example (FIG. 4 (b)) of the present invention.

FIG. 5 shows SEM images and TEM images of the graphene surface in each sample obtained in Example of the present invention. Herein, (a) shows SEM image of HSH+HPH #1, (b) shows SEM image of HSH+HPH #3, (c) shows SEM image of HSH+HPH #5 and (d) shows TEM image of HSH+HPH #5.

FIG. 6 shows SEM images and TEM images of the surface of graphene in each sample obtained in Comparative Example of the present invention. Herein, (e) shows SEM image of HPH only #1, (f) shows SEM image of HPH only #3, (g) shows SEM image of HPH only #5 and (h) shows TEM image of HPH only #5.

DETAILED DESCRIPTION OF THE EMBODIMENTS

Hereinafter, preferred examples are presented to aid in understanding of the invention. However, the following examples are provided only for illustrative purposes, and the scope of the present invention is not limited thereto.

EXAMPLE

Step 1) Preparation of Feed Solution 1.0 g of thermally expanded graphite and 0.5 g of dispersant (Brij S100) were mixed with 500 g of water to prepare a dispersion solution. The solution was stirred with a high speed homogenizer (Silverson model L5M mixer) at 3,000 rpm for 30 minutes to prepare a feed solution.

Step 2) High Pressure Homogenization

The feed solution prepared in the step 1 was fed into the inlet of the high pressure homogenizer. The high-pressure homogenizer has a structure including an inlet of the raw material, an outlet of the exfoliated product, and a microchannel that connects between the inlet and the outlet and has a diameter in a micrometer scale. The feed solution was introduced in the inlet while applying high-pressure of 1600 bar, and a high shear force was applied while passing through a micro-channel having a diameter of 75 μm. A certain amount of sample was taken from the outlet, and named 'HSH+HPH #1'.

The remainder except for the above sample was reintroduced into the inlet of the high pressure homogenizer and subjected to high pressure homogenization process. Then, a certain amount of sample was taken from the outlet, and named 'HSH+HPH #2'. This process was repeated, and the samples taken from the outlet were named 'HSH+HPH #3' through 'HSH+HPH #10' according to the number of times of subjecting to high pressure homogenization process.

Comparative Example

The process was carried out in the same manner as in the Example, but the dispersion solution prepared in the step 1 of Example 1 was immediately applied to the step 2 of Example 1 without performing high-speed homogenization. Then, the samples taken from the outlet was named 'HPH only #1' through 'HPH only #10', respectively, according to the number of times subjected to the high pressure homogenization process Experimental Example 1: Comparison of Graphene Concentrations The graphene concentrations of the samples obtained in the Examples and Comparative Examples were compared. Each sample was centrifuged at 3000 rpm for 10 minutes to remove chunks, and the supernatant was recovered and diluted 5-fold for measurement. Specifically, the graphene concentration was calculated by measuring the absorbance at a wavelength of 660 nm and using Lambert-Beer's law, and the results were shown in FIG. 1.

As shown in FIG. 1, in the case of Comparative Example, even when the dispersion solution was supplied to the high-pressure homogenizer without high-speed homogenization process, only a portion of the expanded graphite was passed through the micro-channel, and a substantial amount of the expanded graphite remained in the inlet of the high-pressure homogenizer. Thus, even when the high-pressure homogenization process was repeated ten times, the concentration of graphene was low.

On the other hand, in the case of Example, the feed solution prepared by subjecting the dispersion solution to high speed homogenization was sufficiently mixed with the expanded graphite, the dispersant, and the solvent, so that the dispersed state was excellent and the mixture was well passed through the micro-channel without the expanded graphite remaining in the inlet at the time of feeding to the high pressure homogenizer.

Thus, the efficiency of high-pressure homogenization was increased and the concentration of graphene was higher than that of Comparative Example. In case where the high pressure homogenization process was repeated 10 times, it exhibited about 6 times higher graphene concentration higher than that of Comparative Example where the homogenization process was repeated the same number of times.

Experimental Example 2: Comparison of Graphene Sizes

The sizes of the graphene in each sample obtained in the Examples and Comparative Examples were measured. Specifically, as for each sample, the lateral size distribution of graphene dispersed was measured with a particle size analyzer (LA-960 Laser Particle Size Analyzer), and the results were shown in FIG. 2 to FIG. 4.

As shown in FIGS. 2 and 3, the graphene average size of the Examples was more narrowed as a whole as relative to the Comparative Example. In particular, the Comparative Example showed a bimodal distribution in all samples, indicating that the Example produced a more uniform size of graphene.

In addition, as shown in FIG. 4, the standard deviation of the average diameter was large in the Comparative Example, while the standard deviation of the average diameter was small in the Examples. From the results, it was confirmed that the method for producing graphene according to the present invention can produce graphene having a more uniform size.

Experimental Example 3: Comparison of Graphene Surface

The surfaces of graphene in each sample obtained in the Examples and Comparative Examples were confirmed by SEM images, and the results were shown in FIG. 5 and FIG. 6.

As shown in FIG. 5, it was confirmed that the graphene flakes were well exfoliated even when the high-pressure homogenization process was carried out five times, and that the surface roughness of the surface was improved as compared with the Comparative Example (FIG. 6).

The invention claimed is:

1. A method for preparing graphene comprising:
   a step of subjecting a dispersion solution containing expanded graphite and a dispersant to high speed homogenization to prepare a feed solution (step 1); and
   a step of passing the feed solution through a high-pressure homogenizer including an inlet, an outlet, and a microchannel that connects between the inlet and the outlet and has a diameter in a micrometer scale (step 2),
   wherein the weight ratio of the expanded graphite and the dispersant is 2.5 to 20, and
   the high-speed homogenization is carried out by stirring the dispersion solution at 3000 to 8000 rpm.

2. The method for preparing graphene according to claim 1, wherein
   the expanded graphite has a tap density of 0.01 to 0.5 g/cm$^3$ and BET (surface area) of 5 to 50 m$^2$/g.

3. The method for preparing graphene according to claim 1, wherein
   the dispersant is pyrene-based low molecular weight derivatives; cellulosic polymers; cationic surfactants; anionic surfactants; gum arabic; n-dodecyl b-D-maltoside; amphoteric surfactants; polyvinylpyrrolidone-based polymers; polyethylene oxide-based polymers; ethylene oxide-propylene oxide copolymers; tannic acid; or a mixture of plural kinds of polyaromatic hydrocarbon oxides, which is a mixture containing polyaromatic hydrocarbon oxides having a molecular weight of 300 to 1000 in an amount of 60 wt % or more.

4. The method for preparing graphene according to claim 1, wherein
the concentration of expanded graphite in the dispersion solution is 0.5 to 5% by weight.

5. The method for preparing graphene according to claim 1, wherein
the solvent of the dispersion solution is one or more selected from the group consisting of water, NMP (N-methyl-2-pyrrolidone), acetone, DMF (N,N-dimethylformamide), DMSO (dimethyl sulfoxide), CHP (cyclohexyl-pyrrolidinone), N12P (N-dodecyl-pyrrolidone), benzyl benzoate, N8P (N-octyl-pyrrolidone), DMEU (dimethyl-imidazolidinone), cyclohexanone, DMA (dimethylacetamide), NMF (N-methyl formamide), bromobenzene, chloroform, chlorobenzene, benzonitrile, quinoline, benzyl ether, ethanol, isopropyl alcohol, methanol, butanol, 2-ethoxyethanol, 2-butoxyethanol, 2-methoxypropanol, THF (tetrahydrofuran), ethylene glycol, pyridine, N-vinylpyrrolidone, methyl ethyl ketone (butanone), alpha-terpineol, formic acid, ethyl acetate and acrylonitrile.

6. The method for preparing graphene according to claim 1, wherein
the high-speed homogenization is carried out for 0.5 to 3 hours.

7. The method for preparing graphene according to claim 1, wherein
the expanded graphite in the feed solution is exfoliated while passing through a micro-channel under application of a shear force, thereby preparing a graphene.

8. The method for preparing graphene according to claim 1, wherein
the micro-channel has a diameter of 50 to 300 μm.

9. The method for preparing graphene according to claim 1, wherein
the feed solution is introduced in the inlet of the high-pressure homogenizer under application of a pressure of 500 to 3000 bar and passed through the micro-channel.

10. The method for preparing graphene according to claim 1, wherein
the step 2 is additionally repeated 2 to 10 times.

11. The method for preparing graphene according to claim 1, wherein
the graphene prepared has an average size (lateral size) of 1 to 5 μm.

* * * * *